(12) United States Patent
Gibbens et al.

(10) Patent No.: US 12,437,129 B2
(45) Date of Patent: *Oct. 7, 2025

(54) MODELLING METHOD AND SYSTEM

(71) Applicant: Siemens Industry Software Inc., Plano, TX (US)

(72) Inventors: Michael John Gibbens, Cambridge (GB); Douglas Joseph King, Peterborough (GB); Howard Charles Duncan Mattson, Impington (GB)

(73) Assignee: Siemens Industry Software Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,680

(22) Filed: Jan. 15, 2024

(65) Prior Publication Data

US 2024/0152659 A1    May 9, 2024

Related U.S. Application Data

(63) Continuation of application No. 16/478,810, filed as application No. PCT/EP2017/051371 on Jan. 24, 2017, now Pat. No. 11,947,876.

(51) Int. Cl.
*G06F 30/17* (2020.01)
*G06F 30/00* (2020.01)
(Continued)

(52) U.S. Cl.
CPC .............. *G06F 30/17* (2020.01); *G06F 30/00* (2020.01); *G06F 2111/04* (2020.01); *G06F 2113/24* (2020.01)

(58) Field of Classification Search
CPC .. G06F 30/20; G06F 2111/04; G06F 2113/24; G06F 30/17
See application file for complete search history.

(56) References Cited

U.S. PATENT DOCUMENTS 6,542,937 B1   4/2003   Kask
6,684,116 B1   1/2004   Scott
(Continued)

FOREIGN PATENT DOCUMENTS

CN    102067131 A    5/2011

OTHER PUBLICATIONS

Klaas Jan De Kraker et al.: "Maintaining multiple views in feature modeling", ACM, 2 Penn Plaza, Suite 701—New York USA, XP040092136, pp. 123-130, col. 1, line 1-p. 127; 1997.

(Continued)

*Primary Examiner* — Bijan Mapar
(74) *Attorney, Agent, or Firm* — Lempia Summerfield Katz LLC

(57) ABSTRACT

A method of modifying a CAD system model performed on a data processing system includes receiving a dataset of co-ordinates representing an article in 2d, or in 3d and receiving 2d or 3d constraints respectively, to be applied to any changes to the dataset of co-ordinates for the article. A modification to be applied to the dataset is received and combined with the relevant 2d and 3d constraints to produce a constrained modification for each of the article and associated article. The constrained modification is solved in 2d and in 3d to determine whether a solution exists in which all constraints are met. If the solve is successful, the constrained modification is applied to each dataset simultaneously and, updated datasets are stored. If the solve fails, the constraints may be reduced and the solve step repeated, or the process is terminated.

18 Claims, 13 Drawing Sheets

(51) Int. Cl.
*G06F 111/04* (2020.01)
*G06F 113/24* (2020.01)

(56) References Cited

U.S. PATENT DOCUMENTS

| | | | |
|---|---|---|---|
| 6,694,199 | B1 | 2/2004 | Yamada |
| 2002/0038163 | A1 | 3/2002 | Hazama |
| 2003/0071810 | A1 | 4/2003 | Shoov |
| 2005/0005670 | A1 | 1/2005 | Durney |
| 2005/0135670 | A1 | 6/2005 | Vaidyanathan |
| 2006/0079989 | A1 | 4/2006 | Ishii |
| 2009/0005899 | A1 | 1/2009 | Hochenauer |
| 2010/0238167 | A1 | 9/2010 | Black |
| 2014/0324394 | A1 | 10/2014 | Mattson |

OTHER PUBLICATIONS

FEMET Prüflabor und Systemhaus: "3D Scanning live in Geomagic", YouTube, pp. 1-1, XP054977374; Retrieved from the Internet: URL:https://www.youtube.com/watch?v=GTxn-m6uNQA; 2015.

Iandoflemon: "Abaqus Contact Model Tutorial—Three Point Bend", YouTube'; pp. 1-1, XP054977375; Retrieved from the Internet: URL:https://www.youtube.com/watch?v=soYwaW54WRg; 2013.

Wang, Yanwei, Liping Chen, Zhengdong Huang, J. Wu, Andy. Zhong. "A history-independent modelling-oriented approach to solve geometric constraints between features in 30 space." The International Journal of Advanced Manufacturing Technology 25, No. 3-4 (2005): 334-342 (Year: 2005).

Cheok, B. T., J. Y. Li, and A. Y. C. Nee. "Integrated feature-based modelling and process planning of bending operations in progressive die design." The International Journal of Advanced Manufacturing Technology 20, No. 12 (2002): 883-895 (Year: 2002).

Authors Un Known, 3D Laser Scanning in the Metal Fabricating I Sheet Metal Industry, LaserDesign, archived on Apr. 4, 2015 and obtained from https ://web .archive .org/web/20150404122734/ https ://www.laserdesign.com/ 3d-laser-scanning-in-the-metal-fabricating-sheet-metal-industry/ on Aug. 14, 2021, 3 pages (Year: 2015).

Authors Unknown, Solid Edge Sheet Metal, Siemens, 2019, 17 pages (Year: 2019).

MODELLING METHOD AND SYSTEM

CROSS REFERENCE TO RELATED APPLICATIONS

This application is a continuation of U.S. application Ser. No. 16/478,810 filed Jul. 17, 2019 which is a US National Stage of International Application No. PCT/EP2017/051371 filed Jan. 24, 2017, and claims the benefit thereof. All applications are incorporated by reference herein in their entirety.

TECHNICAL FIELD

This present disclosure relates to the general field of computer aided design, drafting ("CAD"), manufacturing ("CAM") and visualisation systems (individually and collectively "CAD systems"), product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved methods and systems are desirable.

SUMMARY OF THE DISCLOSURE

Various disclosed embodiments include methods for modifying a computer aided design (CAD) system model in a modelling system.

A method of modifying a computer aided design (CAD) system model, the method performed on a data processing system may comprise receiving a dataset of co-ordinates representing an article in 2-dimensions, or representing an associated article in 3-dimensions; receiving 2D constraints for the article and 3D constraints for the associated article to be applied to any changes to the dataset of co-ordinates for the article or the associated article; receiving a modification to be applied to either the dataset of the article or to the dataset of the associated article; combining the relevant 2D and 3D constraints with the modification to produce a constrained modification for each of the article and associated article; solving the constrained modification in 2-dimensions and in 3-dimensions, to determine whether a solution exists in which all constraints are met; if the solve is successful, simultaneously applying the constrained modification to each dataset; and, storing updated datasets for the article and for the associated article; or, if the solve fails, reducing the constraints and returning to the solve step, or terminating the process.

A data processing system may include a processor; and an accessible memory, the data processing system particularly configured to carry out the steps of receiving a dataset of co-ordinates representing an article in 2-dimensions, or representing an associated article in 3-dimensions; receiving 2D constraints for the article and 3D constraints for the associated article to be applied to any changes to the dataset of co-ordinates for the article or the associated article; receiving a modification to be applied to either the dataset of the article or to the dataset of the associated article; combining the relevant 2D and 3D constraints with the modification to produce a constrained modification for each of the article and associated article; solving the constrained modification in 2-dimensions and in 3-dimensions to determine whether a solution exists in which all constraints are met; if the solve is successful, simultaneously applying the constrained modification to each dataset; and, storing updated datasets for the article and for the associated article; or, if the solve fails, reducing the constraints and returning to the solve step, or terminating the process.

A non-transitory computer-readable medium encoded with executable instructions that, when executed, cause one or more data processing systems to perform a method of modifying a computer aided design (CAD) system model, the method performed on a data processing system, the method comprising receiving a dataset of co-ordinates representing an article in 2-dimensions, or representing an associated article in 3-dimensions; receiving 2D constraints for the article and 3D constraints for the associated article to be applied to any changes to the dataset of co-ordinates for the article or the associated article; receiving a modification to be applied to either the dataset of the article or to the dataset of the associated article; combining the relevant 2D and 3D constraints with the modification to produce a constrained modification for each of the article and associated article; solving the constrained modification in 2-dimensions and in 3-dimensions, to determine whether a solution exists in which all constraints are met; if the plausibility check is passed, simultaneously applying the constrained modification to each dataset; and, storing updated datasets for the article and for the associated article; or, if the solve fails, reducing the constraints and returning to the solve step, or terminating the process.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

An example of method and system according to the present disclosure will now be described with reference to the accompanying drawings in which.

DETAILED DESCRIPTION

The embodiments of FIGS. 1 to 16 used to describe the principles of the present disclosure in this document are by way of illustration only and should not be construed in any way to limit the scope of the disclosure. Those skilled in the art will understand that the principles of the present disclosure may be implemented in any suitably arranged device, apparatus, system, or method.

Figure 1:
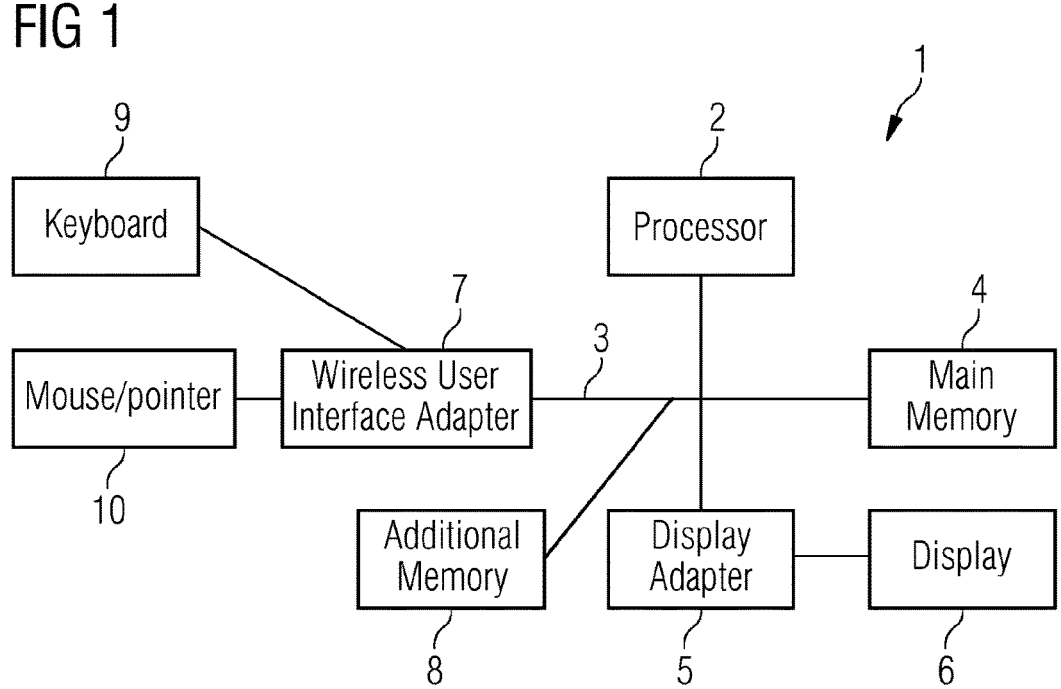
FIG. 1 is a block diagram of a data processing system in which an embodiment can be implemented.

FIG. 1 illustrates an example of a data processing system in which an embodiment of the present disclosure may be implemented, for example a CAD system configured to perform processes as described herein. The data processing system 1 comprises a processor 2 connected to a local system bus 3. The local system bus connects the processor to a main memory 4 and graphics display adaptor 5, which may be connected to a display 6. The data processing system may communicate with other systems via a wireless user interface adapter connected to the local system bus 3, or via a wired network, e.g. to a local area network. Additional memory 8 may also be connected via the local system bus. A suitable adaptor, such as wireless user interface adapter 7, for other peripheral devices, such as a keyboard 9 and mouse 10, or other pointing device, allows the user to provide input to the data processing system. Other peripheral devices may include one or more I/O controllers such as USB controllers, Bluetooth controllers, and/or dedicated audio controllers (connected to speakers and/or microphones). It should also be appreciated that various peripherals may be connected to the USB controller (via various USB ports) including input devices (e.g., keyboard, mouse, touch screen, trackball, camera, microphone, scanners), output devices (e.g., printers, speakers), or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware connected to the I/O controllers may include any type of device, machine, or component that is configured to communicate with a data processing system. Further, systems may use other types of input devices to provide inputs for manipulating objects such as a mouse, pointer, touch pad, drawing tablet, track ball, joystick, keypad, keyboard, camera, motion sensing device that captures motion gestures, or any other type of input device capable of providing the inputs described herein.

In CAD systems, a user may wish to model a design for an object, generate manufacturing instructions for manufacturing that object, or make modifications to the design or manufacturing instructions. Modifications to the design in one format may have an unexpected or undesirable effect on the design in another format, in particular when determining production line processes, such as cutting and assembling sheet metal or other parts which may be bent into shape, so it is desirable to achieve consistent behaviour when an edit is applied to any element of a shape.

The present disclosure relates to a system and method for controlling behaviour of edits in a variational system. When editing shapes in three dimensions within a variational system, such as Synchronous Technology, the behaviour produced in the equivalent part in two dimensions is not always clear. This can result in complex 2d shapes which are difficult to handle on a production line.

Although this disclosure refers mainly to example of sheet metal patterns, cut-outs and bending, it is equally applicable to any shape which is both bendable and predictable in how it behaves when it is bent. For example, thin walled tubes or piping which require an opening to join another such tube or piping may be bent about a cylinder using this technique.

In this disclosure, an article and an associated article are represented in a computer aided design model in their 2-D and 3-D form, then a transform is applied comprising a constrained modification, the transform applying the same relative change to the co-ordinates of each of the article and associated article simultaneously. This has the benefit that the data processing system avoids unnecessary calculations which would generate a result that could not be applied to the flat stock for manufacturing, whilst allowing the user to apply a change to either model.

Figure 2:
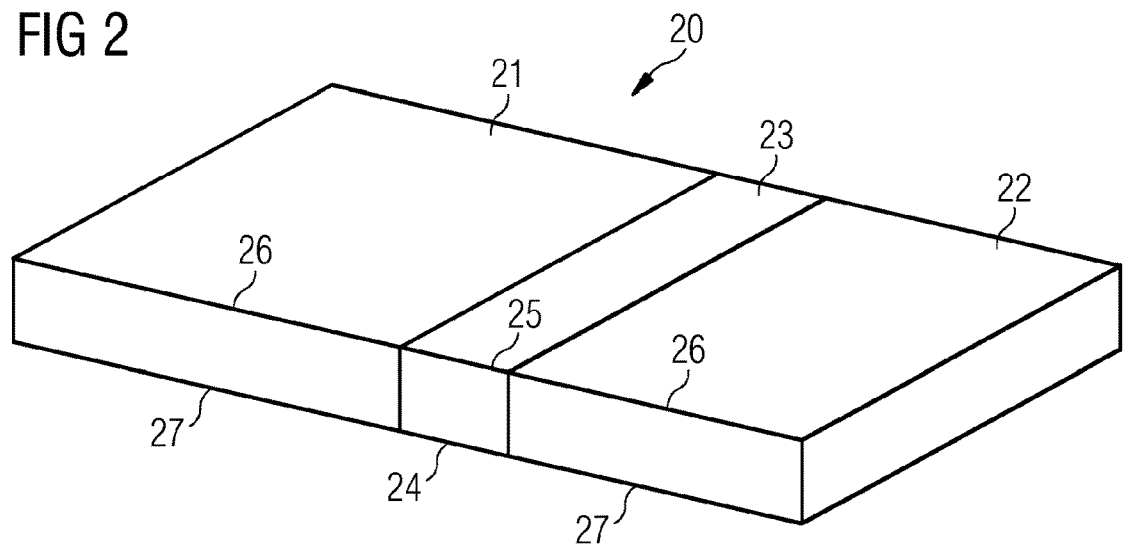
FIG. 2 illustrates a sheet material model, in 2-dimensions.
Figure 3:
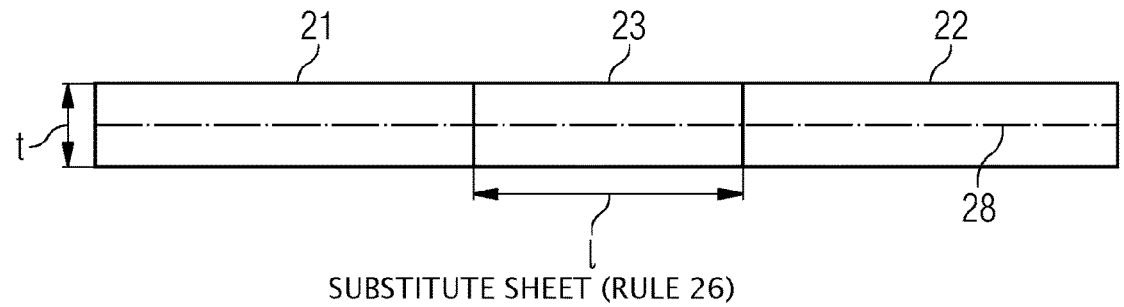
FIG. 3 illustrates the geometry of the model of FIG. 2.
Figure 4:
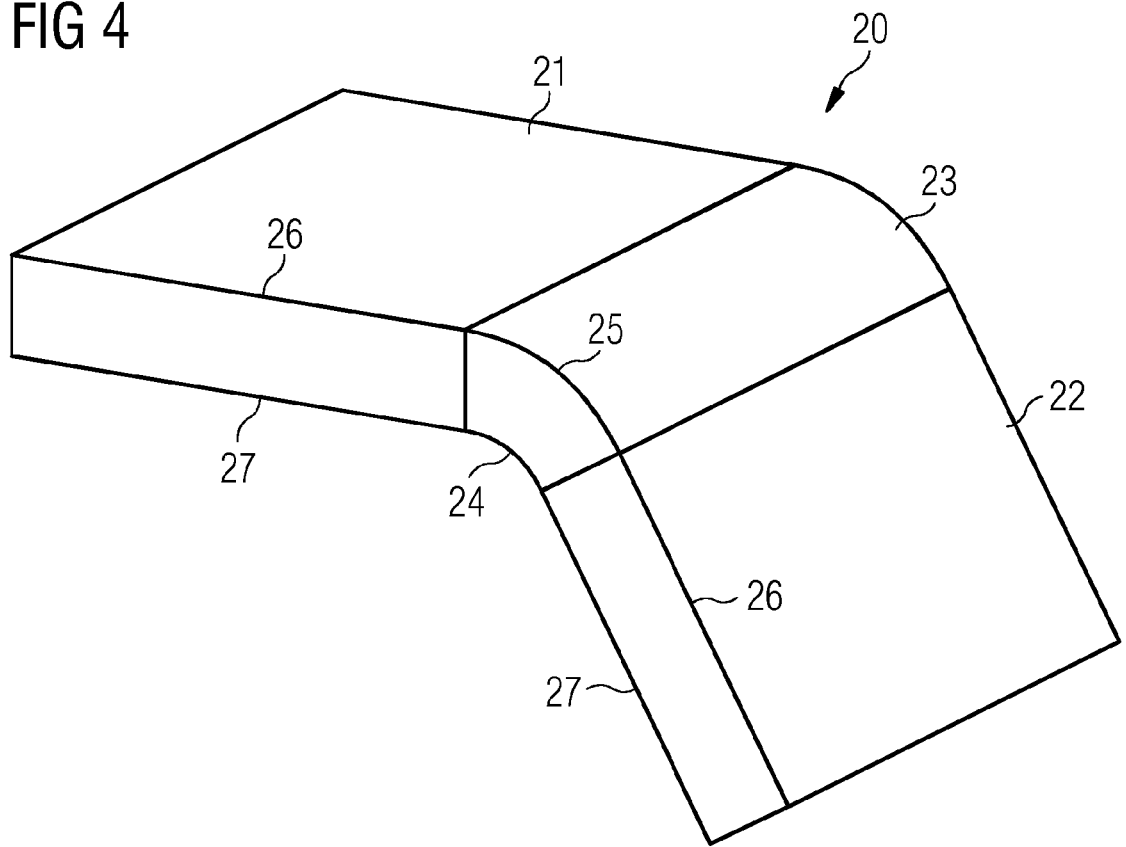
FIG. 4 illustrates a sheet material model of a simple bend applied to the model of FIG. 2, in 3-dimensions.

FIG. 2 illustrates a sheet material 20 in flat space, i.e. in 2-dimensions. FIG. 4, described below, illustrates the corresponding sheet material 20 in 3 dimensions, after a simple bend has been applied. The flat sheet may be considered to comprise three sections, end sections 21, 22 and a midsection 23. Each end section has an upper and lower surface 26, 27 and the mid-section has an upper and lower surface 25, 24. The sheet may be represented geometrically as illustrated in FIG. 3. The sheet has a neutral layer 28, cross section thickness, t and mid-section length, l.

Figure 5:
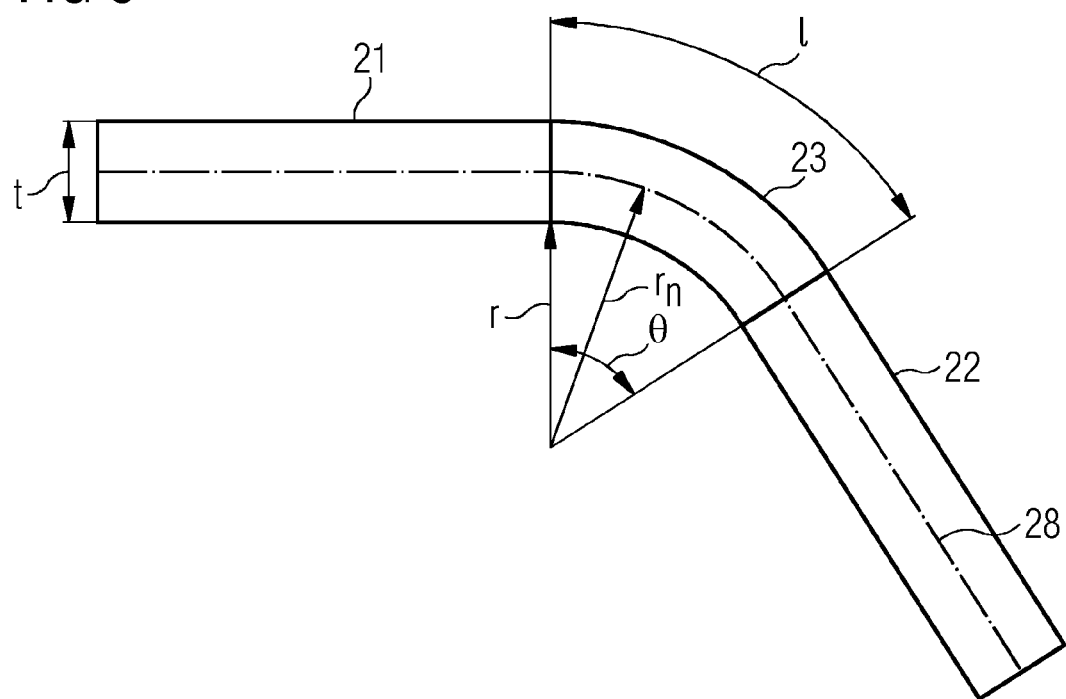
FIG. 5 illustrates the geometry of the model of FIG. 4.

FIG. 4 illustrates the sheet of material 20 after it has been bent into a different orientation. During manufacture of a part, the initially flat sheet, shown in FIG. 2, is typically bent by applying a force to one end of sheet, whilst clamping the other end in place. When bent, the relationship of the top and bottom surfaces 26, 27 of the end sections 21, 22, effectively plates, remains unaltered, as compared to the flat sheet. After the bend has been applied, the midsection 23, the blend angle between the plates, is compressed on one surface 24 and stretched on the opposite surface 25. FIG. 5 represents the bent sheet geometrically showing the neutral layer 28 in which the bend length, l in the neutral layer is now the length of an arc $r_n$ θ, where r is the bend radius, θ the bend angle, f the neutral factor and $r_n$ a neutral radius equal to r+tf. The neutral layer illustrated in FIGS. 3 and 5 is where the length remains the same, when a bend is formed, despite the bend causing the inside layer 24 to compress and the outside layer 25 to stretch. The neutral factor is set dependent on material properties of the sheet material being modelled. The constructions and calculations in this method are all based on this neutral layer and neutral radius.

When preparing a CAD design of a product to be manufactured from sheet material, the engineer needs to design the final form to match the functional requirement, whilst also optimising the manufacturing process. Manufacturing from sheets, which may comprise sheet metal, plastic, composite, or other material as required by the application, typically comprises a first stage in which the flat stock sheet material is cut to shape and a second stage in which this flat shape is bent into the required form. It is desirable that the shape in the flat is a simple as possible with as few cuts required in the process as possible. Furthermore, it some cases it may be beneficial to minimise changes of direction in the 2d cuts, for example when using laser cutting, as each change of direction requires the laser to dwell, which may lead to overheating.

Figure 6A:
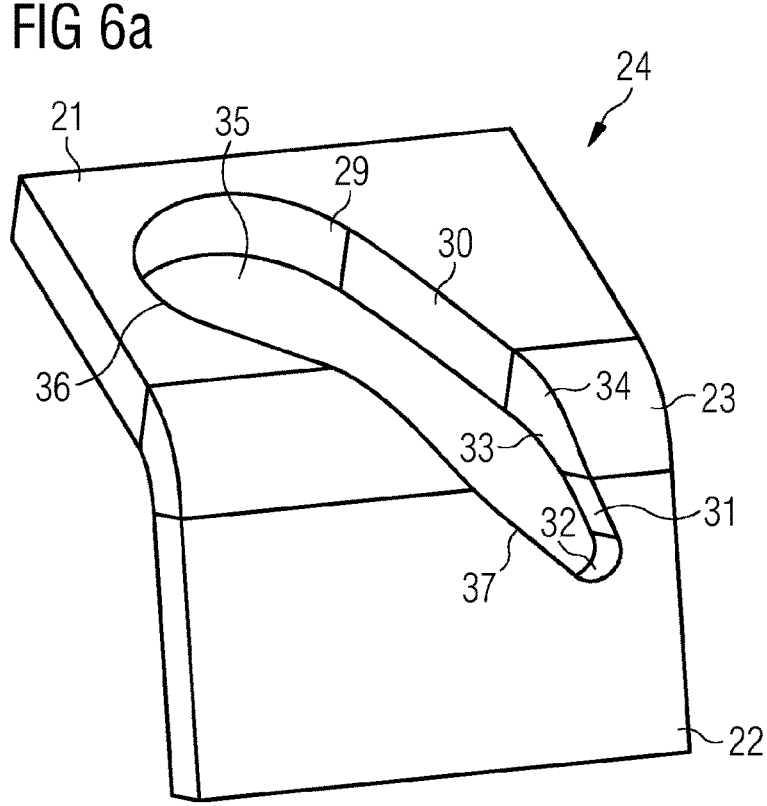
FIGS. 6a and 6b illustrate an example of bent sheet and its associated flat stock to which the method of the present disclosure may be applied.
Figure 6B:
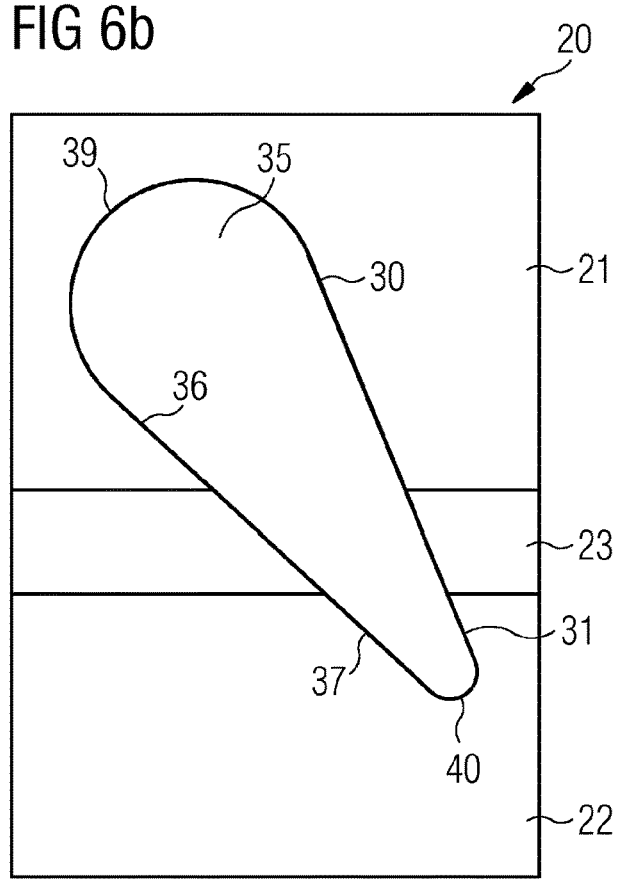

FIGS. 6a and 6b illustrate an example of bent sheet and its associated flat stock to which the method of the present disclosure may be applied. A cut-out 35 has been made in the sheet 20 across a bend region 23. FIG. 6a shows the 3d bent state and FIG. 6b shows the 2d flat state. The cut-out 35 in the flat has a teardrop shape. Faces 30 and 31 are coincident in the flat which makes a single cut possible during the 2d part of the manufacturing process. Faces 36 and 37 are similarly coincident in the flat. The effect of bending this cut-out 35 can be seen in FIG. 6a, where some sections 29, 30, 31, 32 maintain substantially parallel upper and lower surfaces, whereas in the bend region 23, the cut-out 35 shows the different lengths of the lower and upper surfaces 33, 34 where compression and stretching have occurred. In this example, the flat shape is fairly simple and it is desirable to maintain certain aspects of the shape in the flat even when edits are applied to the 3d model, for example to reduce the number of cuts required during the manufacturing process. However, conventional modelling techniques do not keep these coincidence constraints in the flat after applying an edit in 3d.

Figure 7A:
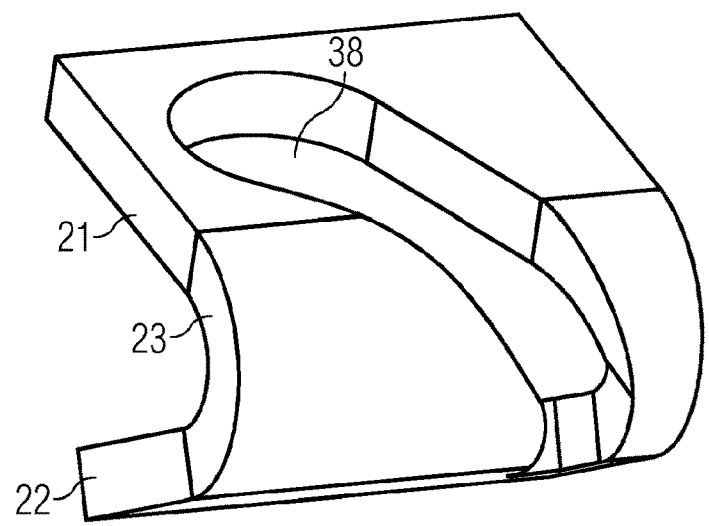
FIGS. 7a and 7b illustrates the effect of changing bent sheet and its associated flat stock without applying the method of the present disclosure.
Figure 7B:
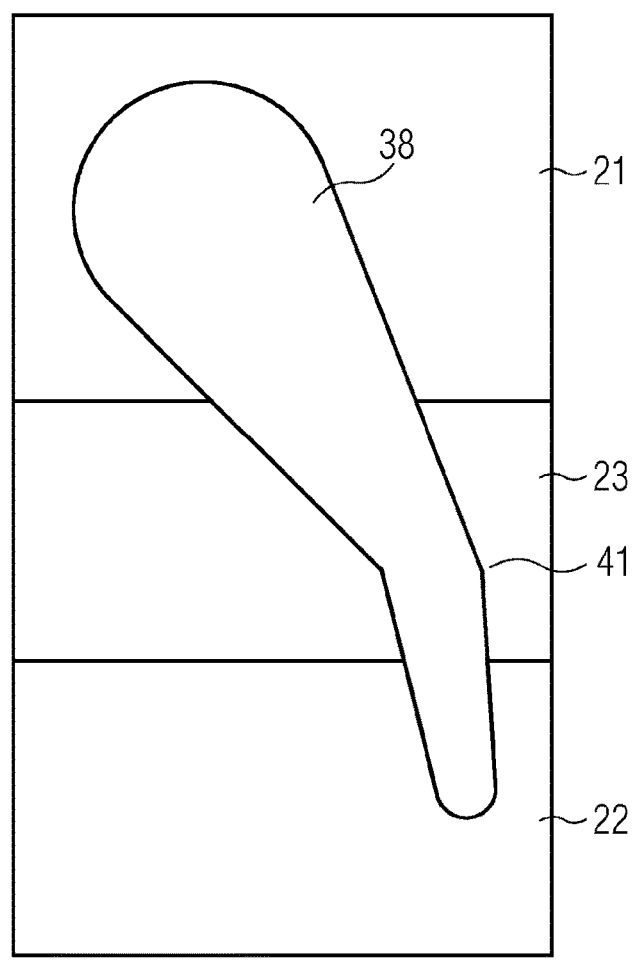

The example of FIGS. 7a and 7b shows how increasing the bend angle of the bend in 3d as shown in FIG. 7a may affect the shape of the cut-out 38 in the 2d sheet shown in FIG. 7b. The flat sheet of FIG. 7b shows the bend region 23 and the unaffected regions 21, 22, but unlike the example of FIG. 6b, where the cut-out 35 is teardrop shaped, in FIG. 7b, the cut-out 38 is no longer teardrop shaped, but has been distorted. This distortion 41 means that the cut-out 38 of FIG. 7b requires a greater number of cuts during manufacturing than the cut-out 35 of the FIG. 6b example. The increase in the number of cuts is time consuming and costly. The present disclosure addresses the problems discussed above.

Conventionally, to avoid changes to the 2d model which add unacceptable complication and cost to the manufacturing process, designers have made modifications to the shape of the cut-out in the flat sheet and then bent the resulting sheet to form the part as an iterative process. Each time this modelling process from 2d to 3d is undertaken, time and additional processing power are required and even then, this iterative process may only produce an approximate result. Alternatively, designers may only add bends, or cut-outs, at a late stage in the design process. In either case, the result is that design changes are hard to implement effectively. Furthermore, in terms of modelling, the designer may wish to edit in either of the bent and flat representations, but there is currently no way of ensuring that a change in the 3-D model does not result in a shape in the flat state that adds unacceptable complication and cost to the manufacturing process.

Figure 8:
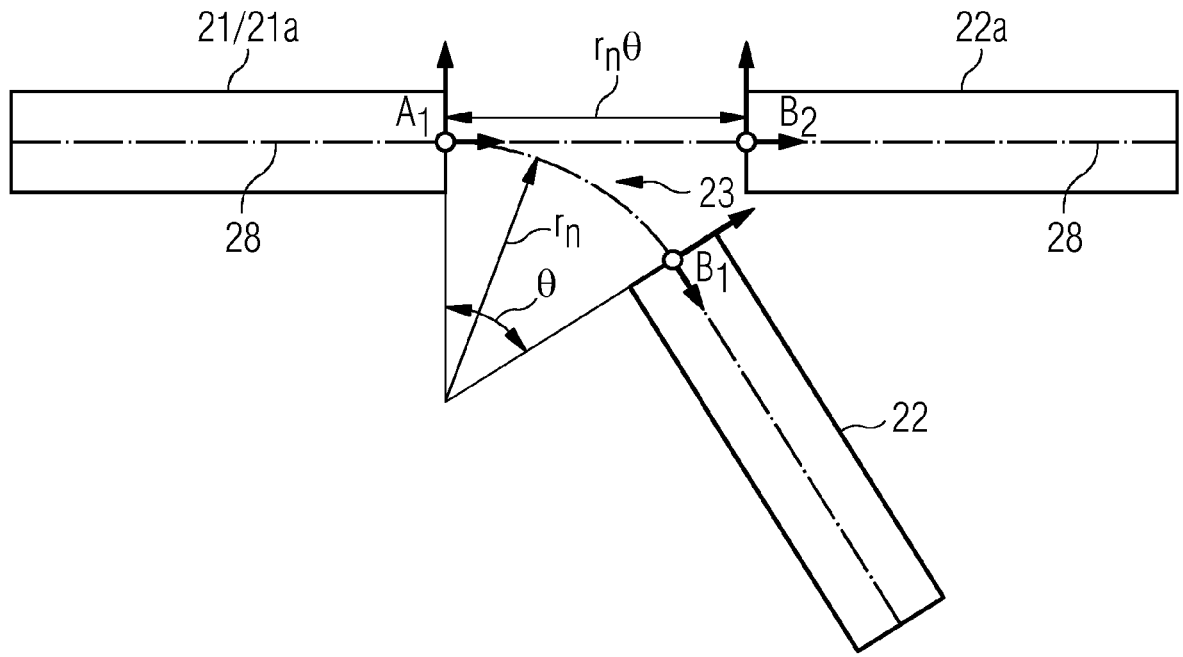
FIG. 8 illustrates the geometry of the model of FIG. 4 in more detail.

The present disclosure addresses this issue by applying two way associative constraints to the models. This is explained in more detail hereinafter. FIG. 8 considers the three sections 21, 22, 23 of the model as a fixed plate, a bend region and a movable plate. A copied representation 21a, 22a of the each plate's geometry in the flat, 2d space, is added to the bent geometry of FIG. 5 as shown in FIG. 8. These copied plates 21a, 22a are constrained relative to their originals when in 3d space, so as to keep the length, l of the bend in the neutral layer 28 equal in flat and 3d space. This applies for all modelling edits such as moving plates, moving geometry within plates, changing the bend angle, changing the bend radius, changing the thickness, etc.

In general both plates have copies in a common flat space, but equally, as in the example shown in FIG. 8, plate 21 may also serve as the flat space copy 21a, thus reducing the construction. Coordinate systems are formed on the bend side of each plate in the neutral layer $A_1$ and $B_1$. Then coordinate frame $B_2$ is formed in the flat space and constrained to be a distance $r_n$ θ from $A_1$ as shown in FIG. 8.

Figure 9:
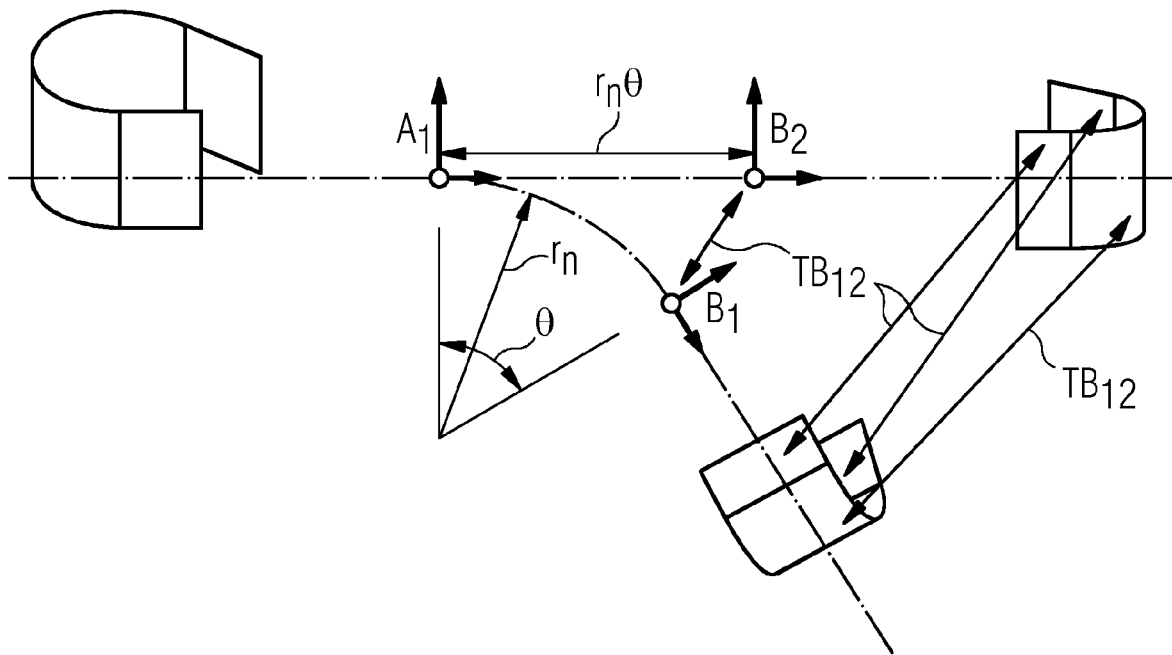
FIG. 9 is an illustration of the geometry for FIGS. 6a and 6b.

The next step is shown in FIG. 9. With $B_2$ constrained in this way, the relative transform $TB_{12}$ between $B_1$ and $B_2$ represents the relative transform that must exist between any further geometry in plate 22 and its copy 22a in flat space. This is achieved by constraining the transforms $TB_{12}$ to be equal, as in this example, based on the previous model of FIGS. 6a and 6b.

Figure 10:
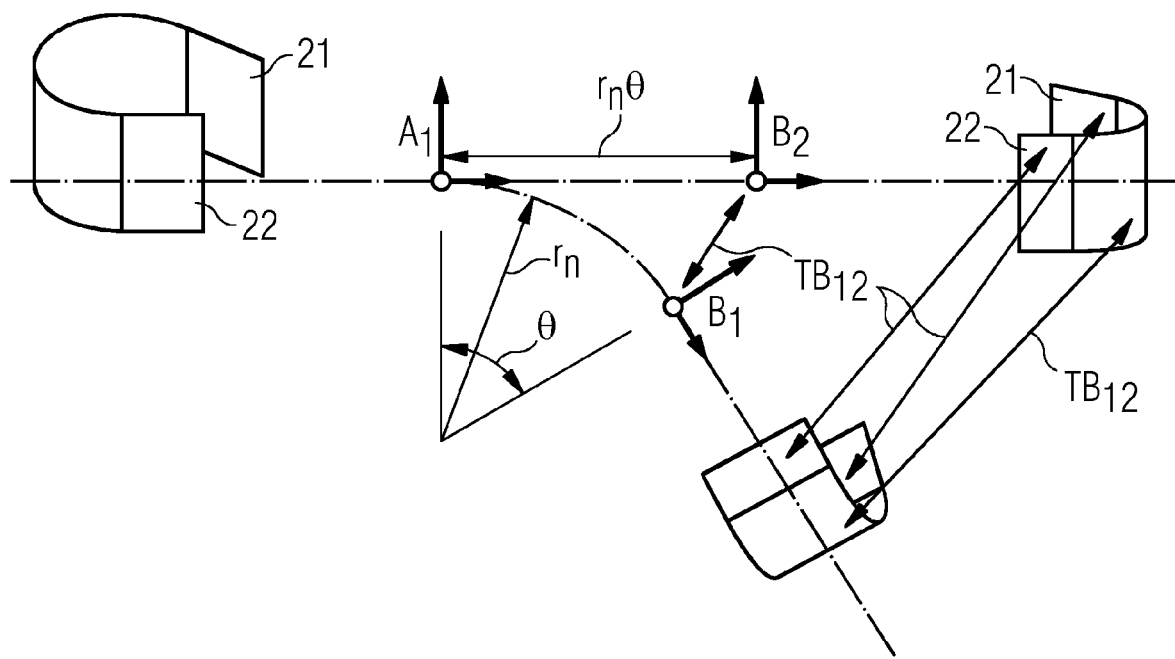
FIG. 10 is a further illustration of the geometry for FIGS. 6a and 6b.

FIG. 10 shows how, with the model constrained as described with respect to FIG. 9, the correct correspondence of any geometric element's location and orientation between its flat and 3d representations are guaranteed. Any relative changes between the plate A and B caused by moving or rotating, for example, will cause the relative transform between $B_1$ and $B_2$ to change and because the other pairs of geometries are constrained to have the same relative transform, they will adjust accordingly to maintain any other constraints in the system. The constraints are non-directional so it is also possible to move geometry in the flat and have that cause appropriate movement in the 3d representation. End sections 21, 22 are then maintained coincident in the flat.

Figure 11A:
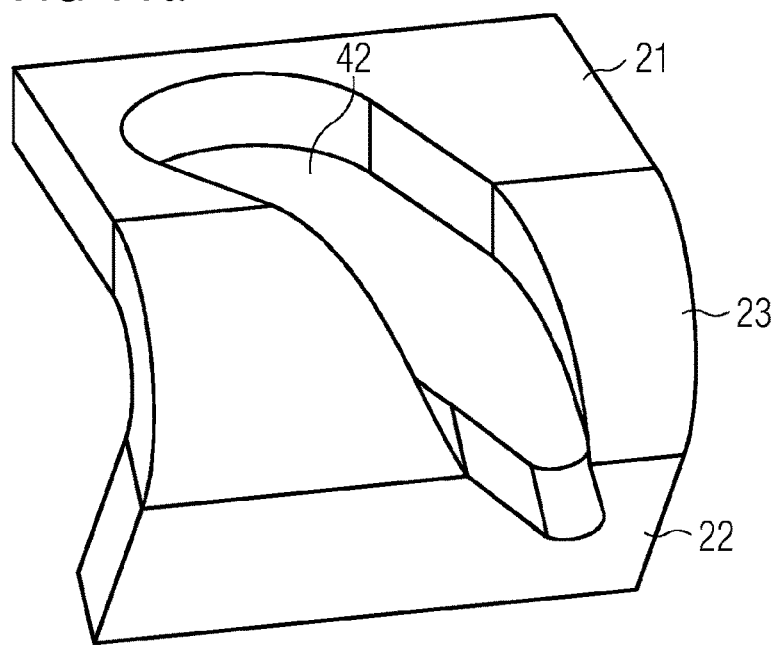
FIGS. 11a and 11b illustrate examples having had the method of the present disclosure applied.
Figure 11B:
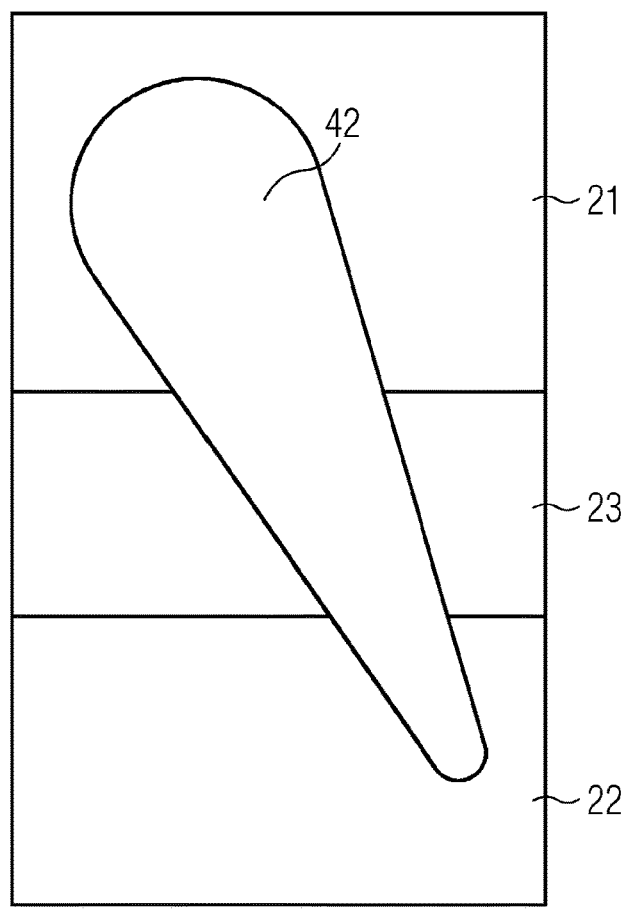

Therefore, it is now possible to add constraints between geometry in plate A and plate B in the common flat space. Consider the example of FIGS. 6a and 6b, maintaining the current conditions, i.e. coincident planes 30 and 31 in the flat, coincident planes 36 and 37 in the flat. This can be achieved by applying the constraints between the geometries in plate A and the flat space copies of B. The cut-out 42 of FIGS. 11a and 11b shows that this produces the desired result under model change, such as increasing the bend angle for example. The result of the method shown in FIGS. 11a and 11b is an improvement over the result in FIGS. 7a and 7b, by virtue of having fewer cuts and fewer kinks in the flat. This makes the design easier to deal with in an automated cutting environment.

All manner of constraints can be similarly added in the flat. For example, if the distance between the cylinders 39,

40 in FIGS. 6a, 6b needs to be maintained, to preserve the overall shape in the flat and allow use of a of a standard punch when manufacturing, then this constraint may be applied by defining a distance constraint in the flat accordingly.

The method of the present disclosure may be applied by the user specifying specific properties in the flat that are to be maintained by the system and indicating which ones are to be applied in a particular situation. For example, coincidence may be indicated, or distance, or both. Having received this particular indication the system then applies the appropriate supporting construction of the method or equivalent construction to yield the same transform relationship between the plates 2d and 3d representations.

However, the method may automate these steps. Provided that the transform taking a plate from its 3d space to its flat counterpart is defined, it is possible to automatically detect if some conditions exist in the flat. The coincidence between certain faces 30, 31 in the flat may be automatically detected and automatically maintained. This feature is particularly useful if the model has been created elsewhere and imported into the system without any specific data about constraints. When the model is to be modified, the conditions may be determined and set as constraints.

In addition to simple constraints, this scheme enables various other programmatic methods to be applied. If the constraint system allows optional constraints, then these can be used to implement behaviour that is desired but not strictly required. For example, the flat shape could be maintained rigid as a preference. The line in the flat space corresponding to the bend axis is available for use by heuristics so, for example, the position of the cut faces, or any other faces, could be preferentially constrained relative to this giving the effect of their moving with the bend. The method is agnostic to the source of the faces under its control, so they do not have to come from explicit 'cut' operations. They could, for example, be the side faces of plates, or hole faces within the plates or any other faces associated with the plates. The method is not restricted to faces, but could be used for edges, vertices and other 'construction' geometry as needed for more advanced constructions. The relative transform maintained by this method can also be used by other non-constraint based methods to, for example, procedurally update other aspects of the design post constraint solving.

Figure 12A:
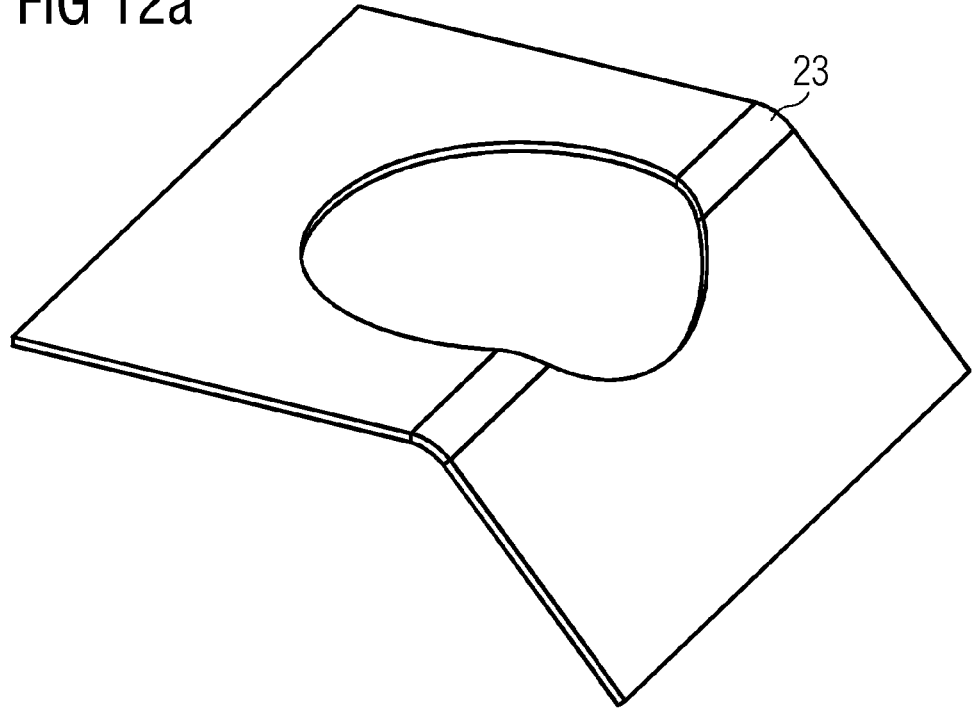
FIGS. 12a and 12b illustrate a further example of bent sheet and its associated flat stock to which the method of the present disclosure may be applied.
Figure 12B:
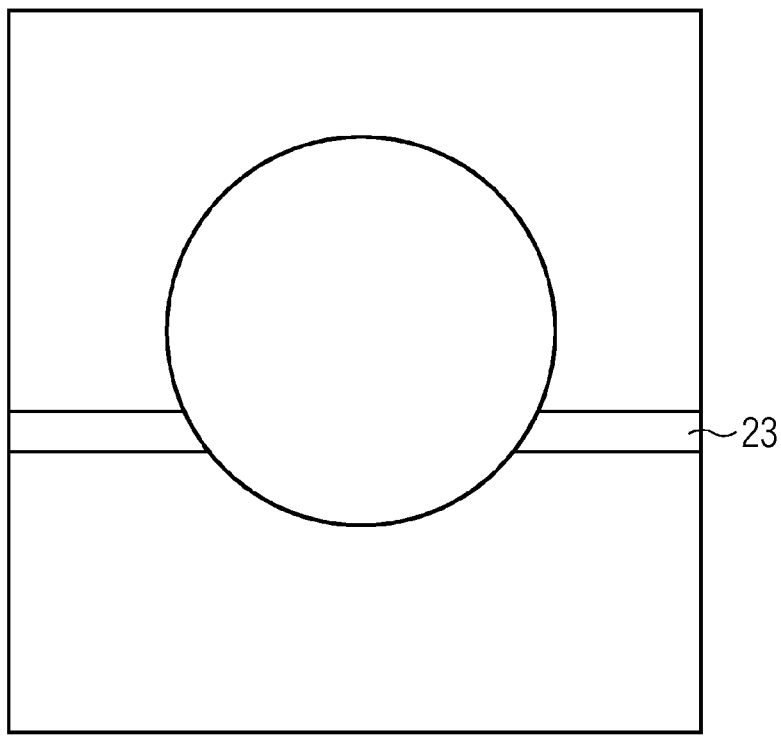
Figure 13A:
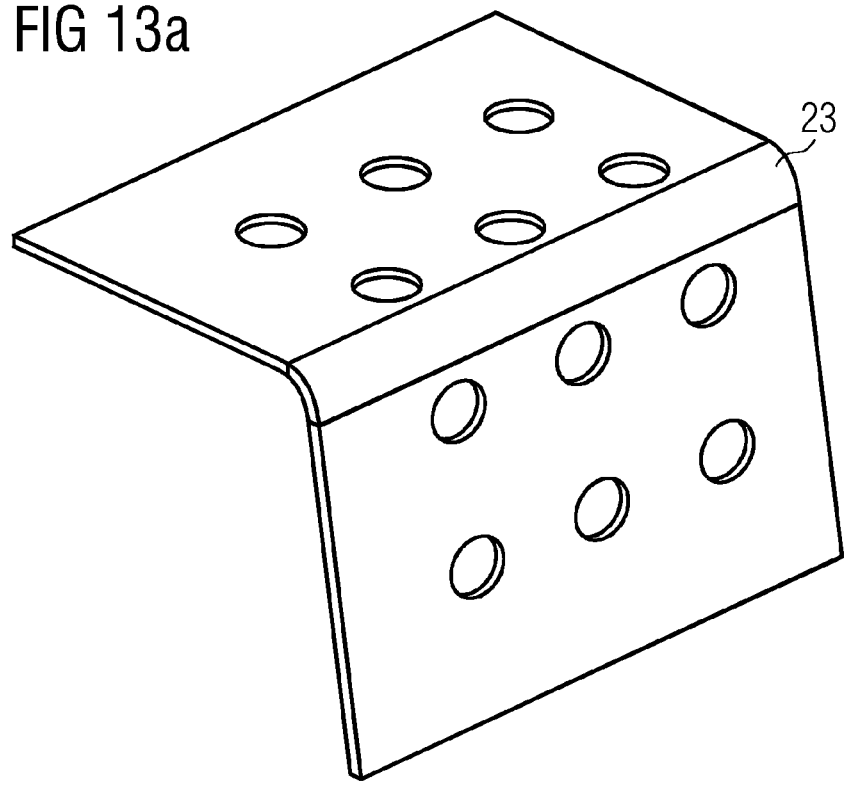
FIGS. 13a and 13b illustrate a further example of bent sheet and its associated flat stock to which the method of the present disclosure may be applied.
Figure 13B:
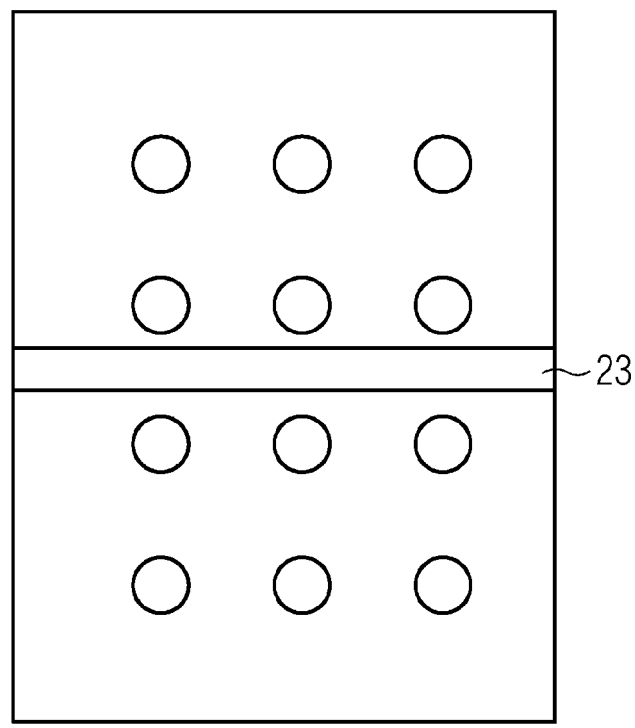
Figure 14A:
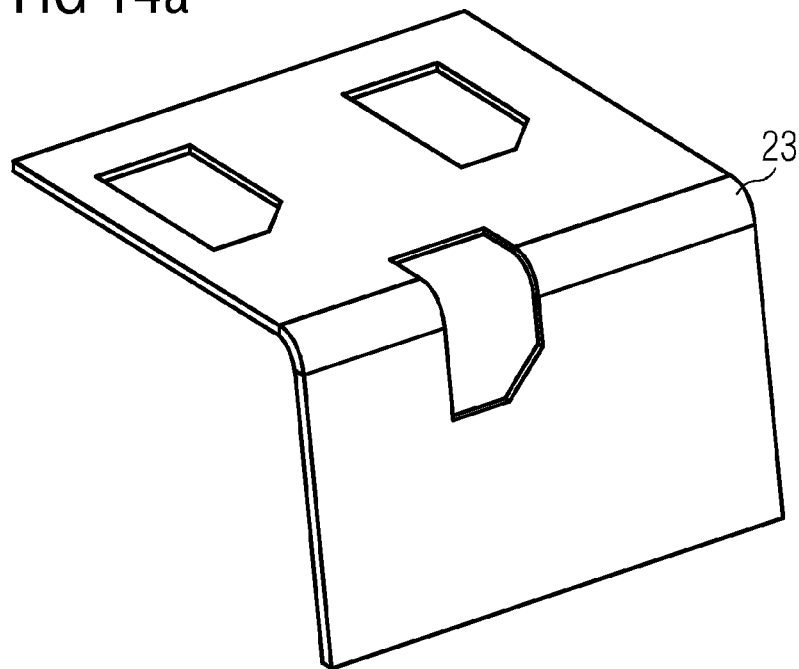
FIGS. 14a and 14b illustrate a further example of bent sheet and its associated flat stock to which the method of the present disclosure may be applied.
Figure 14B:
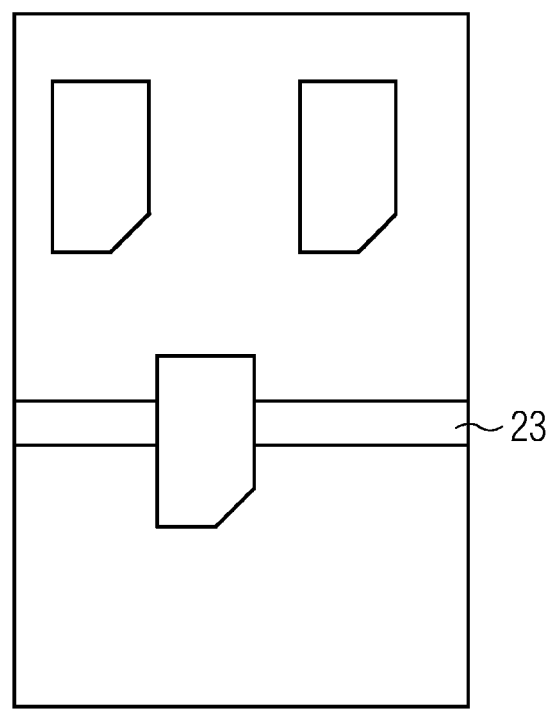

Another example, shown in FIGS. 12a and 12b applying a constraint in order that a change in the bent form (FIG. 12a) maintains segments of a circle on each side of the bend 23 to be the same in the flat, i.e. keep a circle in the flat (FIG. 12b), so that a single simple circle may be cut or punched in the flat, rather than there being discontinuities created, which are harder to deal with in the manufacturing process. FIGS. 13a and 13b illustrate another example, this time using a suitable transform with applied constraints to maintain a regular pattern in the flat (FIG. 13b), when the bend is changed (FIG. 13a), so as to make the 2d process more efficient. Regular patterns can be cut or punched much more easily than irregular ones. The example of FIGS. 14a and 14b follow a repeated cut-out shape in the flat, but at least one of the cut-outs is across a bend. By setting the transform to constrain any changes in the 3d article to maintain the same shape for cuts across bends as the shape for cuts that are not across the bend region in 2d helps reduce the number of different punch tools required for manufacturing.

Figure 15A:
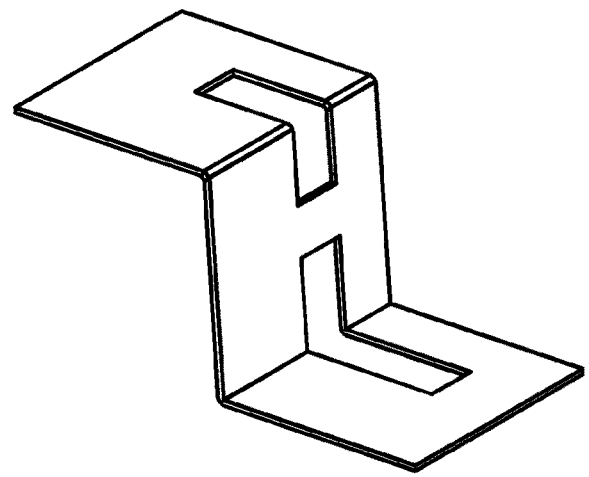
FIGS. 15a to 15f illustrate a number of different examples of bent sheets for which the method of the present disclosure may be applied.
Figure 15B:
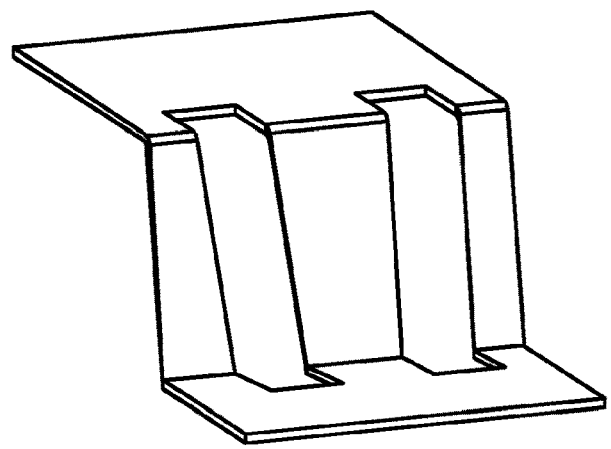
Figure 15C:
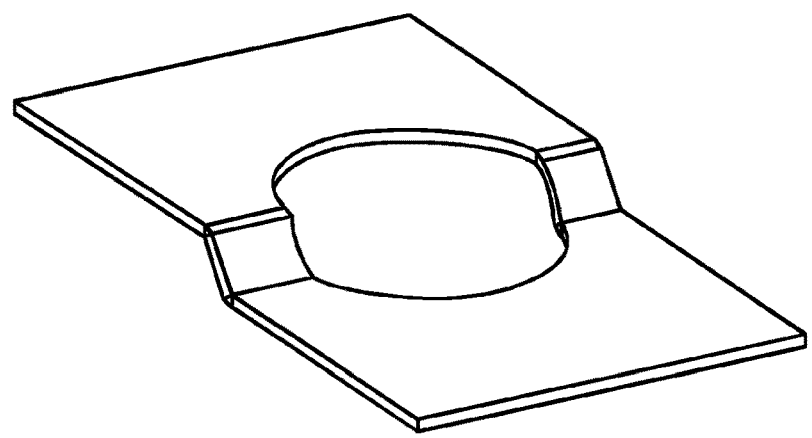
Figure 15D:
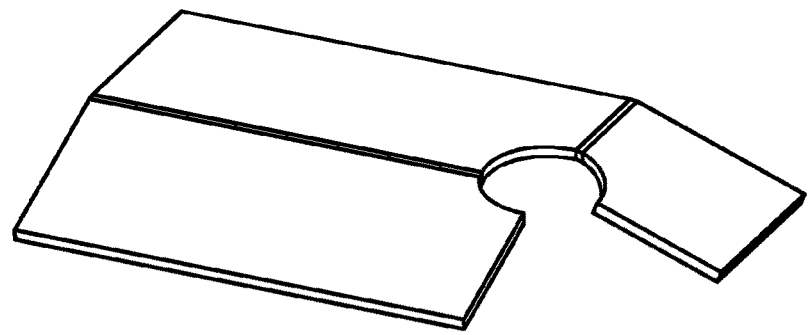
Figure 15E:
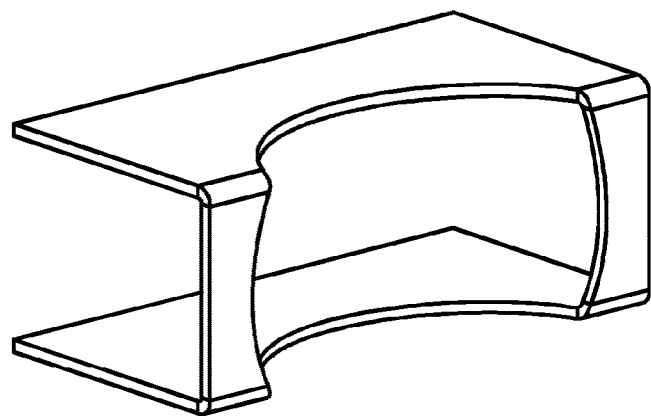
Figure 15F:
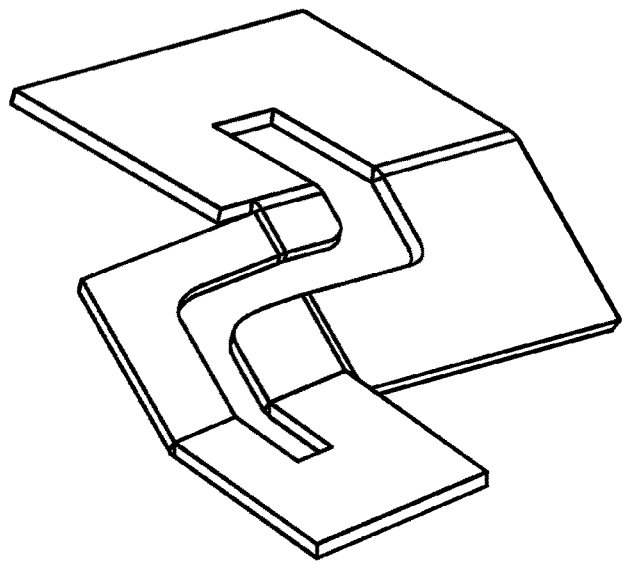

FIGS. 15a to 15e illustrate different examples of shapes in 3d with multiple plates and/or multiple bends. 15a has multiple cut-outs across different bends. FIG. 15b has multiple cut-outs across the same bends. FIG. 15c has a single cut-out across two bends. FIG. 15d has a partial cut-out across different orthogonal bends. FIG. 15e has a single cut-out across two, opposed, bends. FIG. 15f has multiple plates, cut-outs and bends. For any of the examples shown, there may be need to apply constraints of the type described above in combination with one another and the transform may be set accordingly to achieve the desired outcome in the flat, even when changes are made to a 3d model having multiple plates and/or multiple bends.

Considerable cost savings may be achieved by keeping shapes simple, such as circles which may be drilled or cut, or limiting the total number of punch shapes required on the sheet by keeping spacing of shapes constant across a bend, or keeping the same shape and spacing across bend, or keeping the same length in the flat by means of a distance constraint. The specific constraints applied will depend upon the manufacturing requirement, so any constraints may be applied to control the flat and bent state generically and simultaneously. The change may be driven from either the flat or bent state, or both and programmatic heuristics may be applied in both flat and bent space. For example, where offline changes are applied to different parts, all of which are to be manufactured from a particular sheet and those offline changes are subsequently uploaded to the model, then the changes may be applied for some parts to the 3d article and for some to the 2d associated article and the constraints ensure that every change keeps to a form that can actually be manufactured.

Figure 16:
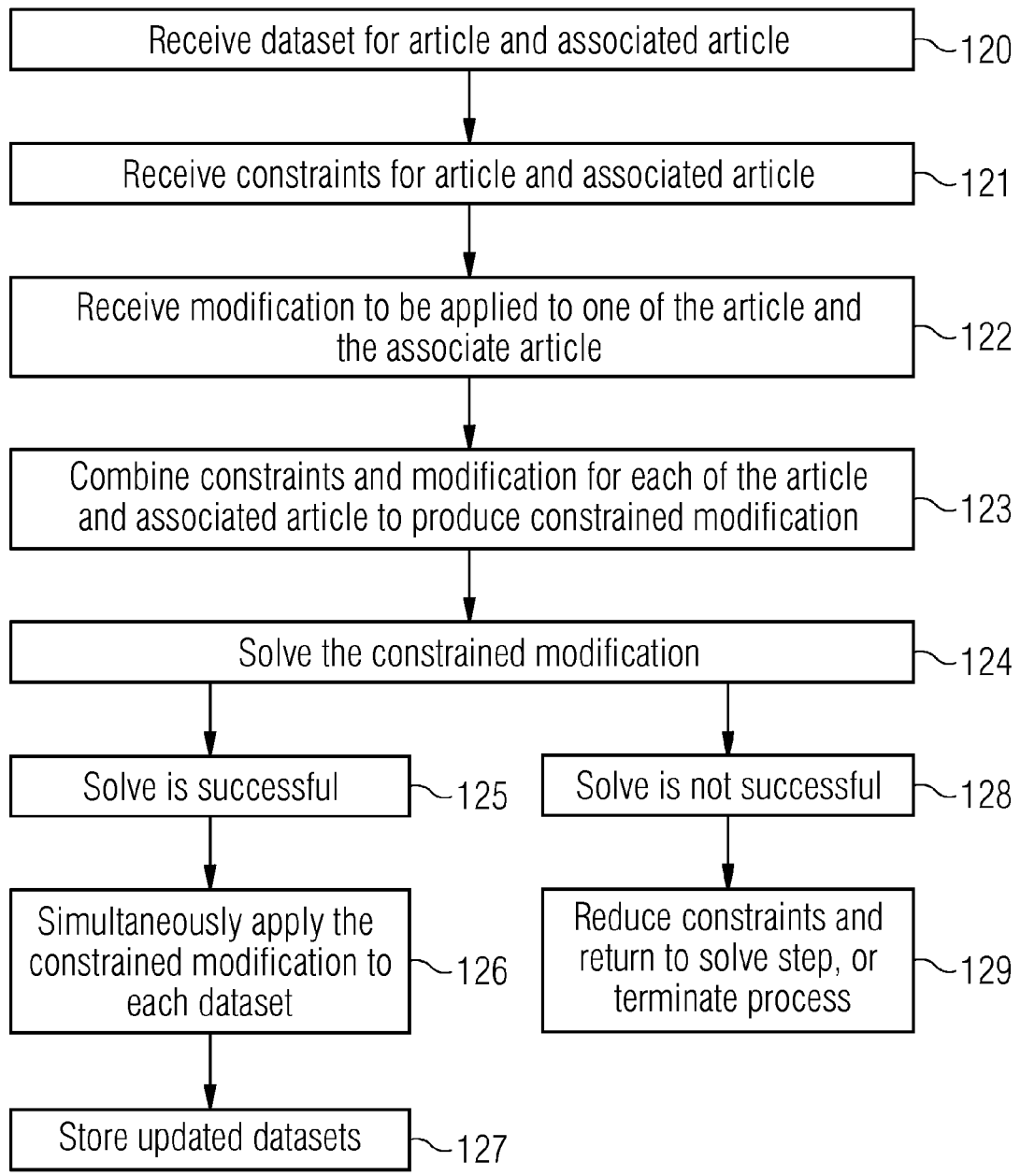
FIG. 16 is a flow diagram of a method of modifying a model in accordance with the disclosed embodiments.

FIG. 16 shows a flow diagram of an example of a method according to the present disclosure. A dataset of co-ordinates representing an article in 2-dimensions, typically a sheet material, or representing an associated article in 3-dimensions, typically the sheet material after it has been subjected to a bend is received 120. 2d constraints are received 121 for the article and 3d constraints are received 121 for the associated article. These constraints may have previously been derived and stored. The constraints are to be applied to any changes to the dataset of co-ordinates for the article or the associated article. A modification to be applied to either the dataset of the article or to the dataset of the associated article is received 122. This modification may be in response to a previous determination by the system that a certain characteristic of the article or associated article must be altered, e.g. a pattern in the flat has been detected that cannot be manufactured, or the modification may result from the edits that the designer has applied to one or other. The designer is able to edit the model in either the 2d or 3d form and account is taken of constraints in the other dimension when the modification is applied.

The relevant 2d and 3d constraints are combined 123 with the modification to produce a constrained modification for each of the article and associated article. To avoid unnecessary processing, the constrained modification is solved 124 in 2-dimensions and in 3-dimensions. If the outcome of the solve 128 does not meet certain predetermined requirements for the sheet material to be able to be processed during manufacturing, then that modification is not applied. Optionally, if the solve fails, the system may be set up with limits to allow it to automatically reduce some of the constraints and return to the solve step. Otherwise, the process is terminated 129. Provided that the solve is successful 125, the constrained modification is applied simultaneously 126 to each dataset and the updated datasets for the article and for the associated article are stored 127.

The received dataset of coordinates may be read in from a store, from another modelling system, or they may have been derived from an actual part, for example by scanning. The method is particularly useful for designing parts which are to be made from sheet metal, i.e. the flat material has the same thickness throughout and undergoes a well defined process when bent, so that its behaviour in the bent state is relatively easy to predict. Any bendable and predictable shapes, for example hollow tubing, when bent around a cylinder may be modelled using the method of this disclosure, as no prediction is made in the bend region.

An operating system included in the data processing system enables an output from the system to be displayed to the user on display 6 and the user to interact with the system. Examples of operating systems that may be used in a data processing system may include Microsoft Windows™, Linux™, UNIX™, iOS™, and Android™ operating systems.

In addition, it should be appreciated that data processing system 1 may be implemented as in a networked environment, distributed system environment, virtual machines in a virtual machine architecture, and/or cloud environment. For example, the processor 2 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system 1 may vary for particular implementations. For example the data processing system 1 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

The data processing system 1 may be connected to the network (not a part of data processing system 1), which can be any public or private data processing system network or combination of networks, as known to those of skill in the art, including the Internet. Data processing system 1 can communicate over the network with one or more other data processing systems such as a server (also not part of the data processing system 1). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

The invention claimed is:

1. A method of modifying a computer aided design (CAD) system model, the method being performed on a data processing system, the method comprising:
  receiving a dataset of coordinates representing a flat sheet stock material in two dimensions, and receiving a dataset of coordinates representing a product to be manufactured from the flat sheet stock material in three dimensions;
  receiving two-dimensional (2D) constraints for the flat sheet stock material and three-dimensional (3D) constraints for the product to be manufactured to be applied to any changes to the dataset of coordinates for the flat sheet stock material or the product to be manufactured;
  receiving a modification to be applied to either the dataset of the flat sheet stock material or to the dataset of the product to be manufactured;
  combining the 2D constraints and the 3D constraints with the modification, such that a constrained modification is produced for each of the flat sheet stock material and product to be manufactured;
  solving the constrained modification in two dimensions and in three dimensions, to determine whether a solution exists in which all constraints are met;
  when the solving is successful:
    simultaneously applying the constrained modification to each of the datasets using a transform applying a same relative change to the coordinates of each of the flat sheet stock material and the product to be manufactured simultaneously; and storing updated datasets for the flat sheet stock material and for the product to be manufactured;

when the solving fails;

reducing the constraints and returning to the solving, or terminating the method; and manufacturing the product from the flat sheet stock material based on the updated datasets.

2. The method according to claim 1, wherein the constrained modification comprises relative transforms by which a change of a coordinate location in two dimensions is mapped to a coordinate location in three dimensions.

3. The method according to claim 1, wherein the constrained modification comprises relative-transforms by which a change of a coordinate location in three dimensions is mapped to a coordinate location in two dimensions.

4. The method according to claim 1, further comprising generating the dataset of coordinates representing the product to be manufactured in three dimensions, the generating of the dataset of coordinates representing the product to be manufactured in three dimensions comprising scanning a manufactured part.

5. The method according to claim 1, wherein the modification comprises rotating a section of the 3D product to be manufactured around a cylinder.

6. The method according to claim 1, wherein receiving the 2D constraints for the flat sheet stock material and the 3D constraints for the product to be manufactured comprises receiving the 2D constraints and the 3D constraints from an external source, or extracting the 2D constraints and the 3D constraints from a store.

7. A method of manufacturing a part, the method comprising:

modifying a computer aided design (CAD) system model, the modifying being performed on a data processing system, the modifying comprising:

receiving a dataset of coordinates representing a flat sheet stock material in two dimensions, and receiving a dataset of coordinates representing a product to be manufactured from the flat sheet stock material in three dimensions;

receiving two-dimensional (2D) constraints for the flat sheet stock material and three-dimensional (3D) constraints for the product to be manufactured to be applied to any changes to the dataset of coordinates for the flat sheet stock material or the product to be manufactured;

receiving a modification to be applied to either the dataset of the flat sheet stock material or to the dataset of the product to be manufactured;

combining the 2D constraints and the 3D constraints with the modification, such that a constrained modification is produced for each of the flat sheet stock material and product to be manufactured;

solving the constrained modification in two dimensions and in three dimensions, to determine whether a solution exists in which all constraints are met; and when the solving is successful:

simultaneously applying the constrained modification to each of the datasets using a transform applying a same relative change to the coordinates of each of the flat sheet stock material and the product to be manufactured simultaneously; and storing updated datasets for the flat sheet stock material and for the product to be manufactured; and when the solving fails:

reducing the constraints and returning to the solving, or terminating the method;

inputting the stored updated dataset for the product to be manufactured to a computer controlled machine; and manufacturing the product to be manufactured in a sheet of material using the computer controlled machine.

8. A data processing system comprising:

a processor; and an accessible memory, wherein the processor is configured to modify a computer aided design (CAD) system model, the processor being configured to modify the CAD system model comprising the processor being configured to:

receive a dataset of coordinates representing an article in two dimensions, and receive a dataset of coordinates representing an associated article in three dimensions;

receive two-dimensional (2D) constraints for the article and three-dimensional (3D) constraints for the associated article to be applied to any changes to the dataset of coordinates for the article or the associated article;

receive a modification to be applied to either the dataset of the article or to the dataset of the associated article;

combine the 2D constraints and the 3D constraints with the modification, such that a constrained modification is produced for each of the article and associated article;

solve the constrained modification in two dimensions and in three dimensions to determine whether a solution exists in which all constraints are met;

when the solve is successful:

simultaneously apply the constrained modification to each of the datasets using a transform applying a same relative change to the coordinates of each of the article and the associated article simultaneously; and store updated datasets for the article and for the associated article;

when the solve fails:

reduce the constraints and return to the solve, or terminate the modification of the CAD system model; and manufacture the associated article from the article based on the updated datasets.

9. A non-transitory computer-readable medium encoded with executable instructions that, when executed, cause one or more data processing systems to modify a computer aided design (CAD) system model, the executable instructions comprising:

receiving a dataset of coordinates representing an article in 2-dimensions, and receiving a dataset of coordinates representing an associated article in three dimensions;

receiving two-dimensional (2D) constraints for the article and three-dimensional (3D) constraints for the associated article to be applied to any changes to the dataset of coordinates for the article or the associated article;

receiving a modification to be applied to either the dataset of the article or to the dataset of the associated article;

combining the 2D constraints and the 3D constraints with the modification, such that a constrained modification is produced for each of the article and associated article;

solving the constrained modification in two dimensions and in three dimensions, to determine whether a solution exists in which all constraints are met;
when the solving is successful:
simultaneously applying the constrained modification to each of the datasets using a transform applying a same relative change to the coordinates of each of the article and the associated article simultaneously;
storing updated datasets for the article and for the associated article; and
when the solving fails:
reducing the constraints and returning to the solving, or terminating the modification of the CAD system model; and
manufacturing the associated article from the article based on the updated datasets.

10. The method according to claim 1, further comprising:
forming a first coordinate system for the flat stock sheet material;
forming a second coordinate system for the product to be manufactured from the flat stock sheet material;
determining the transform based on a difference between a coordinate of the flat stock sheet material in the first coordinate system and a corresponding coordinate of the product to be manufactured in the second coordinate system; and
wherein when the solving is successful, the simultaneously applying the constrained modification to each of the datasets using the transform applying the same relative change to the coordinates of each of the flat stock sheet material and the product to be manufactured simultaneously comprises simultaneously applying the constrained modification to each of the datasets using the transform as a relative change between the coordinate of the flat stock sheet material in the first coordinate system and the corresponding coordinate of the product to be manufactured in the second coordinate system.

11. The data processing system according to claim 8, wherein the article in two dimensions is a flat stock sheet material, and
wherein the associated article in three dimensions is a product to be manufactured from the flat stock sheet material.

12. The data processing system according to claim 11, wherein the processor being configured to modify the CAD system model further comprises the processor being configured to:
form a first coordinate system for the flat stock sheet material;
form a second coordinate system for the product to be manufactured from the flat stock sheet material; and
determine the transform based on a difference between a coordinate of the flat stock sheet material in the first coordinate system and a corresponding coordinate of the product to be manufactured in the second coordinate system, and
wherein when the solve is successful, the simultaneous application of the constrained modification to each of the datasets using the transform applying the same relative change to the coordinates of each of the flat stock sheet material and the product to be manufactured simultaneously comprises simultaneous application of the constrained modification to each of the datasets using the transform as a relative change between the coordinate of the flat stock sheet material in the first coordinate system and the corresponding coordinate of the product to be manufactured in the second coordinate system.

13. The method according to claim 1, wherein the flat sheet stock material comprises a first section, a second section, and a mid-section between the first section and the second section,
wherein the product to be manufactured comprises a fixed plate corresponding to the first section, a movable plate corresponding to the second section, and a bend region corresponding to the mid-section,
wherein upper and lower surfaces of the bend region have different lengths, and
wherein the constrained modification comprises a neutral layer of the bend region, between the upper and lower surfaces, having a same length as a length of a neutral layer of the mid-section between upper and lower surfaces of the mid-section.

14. The method according to claim 13, wherein the first section and the second section comprise upper and lower surfaces, and
wherein the constrained modification comprises that upper and lower surfaces of the fixed plate and the bend region have a same length as the upper and lower surfaces of the first section and the second section, respectively.

15. The method according to claim 13, wherein the bend region is configured such that the movable plate is bent at an angle relative to the fixed plate, and
wherein the modification to the dataset of the product to be manufactured comprises changing the angle that the movable plate is bent relative to the fixed plate.

16. The method according to claim 13, further comprising:
forming a first coordinate system on one side of the second section;
forming a second coordinate system on one side of the movable plate;
forming a third coordinate system on one side of the first section; and
determining the transform based on a difference between the coordinates of the one side of the second section in the first coordinate system and the coordinates of the one side of the movable plate in the second coordinate system.

17. The method according to claim 16, wherein the 2D constraints comprise a distance between the first coordinate system and the third coordinate system, and
wherein the distance is based on the length of the neutral layer of the mid-section.

18. The method according to claim 16, wherein the transform is applied between each coordinate of the second section in the first coordinate system to each corresponding coordinate of the movable plate in the second coordinate system.

* * * * *